United States Patent
Giering et al.

(10) Patent No.: US 9,977,409 B2
(45) Date of Patent: May 22, 2018

(54) SPC FAULT DETECTION AND DIAGNOSTICS ALGORITHM

(75) Inventors: Michael J. Giering, Bolton, CT (US); Ashutosh Tewari, Wethersfield, CT (US)

(73) Assignee: CARRIER CORPORATION, Farmington, CT (US)

( * ) Notice: Subject to any disclaimer, the term of this patent is extended or adjusted under 35 U.S.C. 154(b) by 1235 days.

(21) Appl. No.: 13/995,444

(22) PCT Filed: Dec. 12, 2011

(86) PCT No.: PCT/US2011/064452
§ 371 (c)(1),
(2), (4) Date: Feb. 4, 2014

(87) PCT Pub. No.: WO2012/118550
PCT Pub. Date: Sep. 7, 2012

(65) Prior Publication Data
US 2014/0142727 A1    May 22, 2014

Related U.S. Application Data (60) Provisional application No. 61/448,413, filed on Mar. 2, 2011.

(51) Int. Cl.
*G05B 9/05*   (2006.01)
*F24F 11/00*   (2018.01)
(Continued)

(52) U.S. Cl.
CPC ............ *G05B 9/05* (2013.01); *F24F 11/006* (2013.01); *F24F 11/0086* (2013.01);
(Continued)

(58) Field of Classification Search
CPC .................................................. G05B 9/05
(Continued)

(56) References Cited

U.S. PATENT DOCUMENTS

| 4,301,660 A | 11/1981 | Mueller et al. |
| 4,589,060 A | 5/1986 | Zinsmeyer |

(Continued)

FOREIGN PATENT DOCUMENTS

| CN | 101354316 A | 1/2009 |
| CN | 101893305 A | 11/2010 |

(Continued)

OTHER PUBLICATIONS

International Search Report and Written Opinion for related International Application No. PCT/US11/64452; report dated Mar. 26, 2012.

(Continued)

*Primary Examiner* — Ricky Ngon
(74) *Attorney, Agent, or Firm* — Cantor Colburn LLP (57) ABSTRACT

A method for diagnosing a fault condition in a climate system is disclosed and a computer program product for doing the same. The climate system may be an HVAC system. The method comprises receiving current data from a climate system in a fault condition, calculating an anomaly score for the climate system from a first set of transition probabilities based on the current data and a second set of transition probabilities based on the climate system operating in a normal condition, and generating automatically a diagnosis of a first problem causing the fault condition when the anomaly score is above a predefined threshold. In an embodiment, the current data may include a plurality of operational Parameters of the climate system.

19 Claims, 5 Drawing Sheets

(51) Int. Cl.
    *G05B 15/02* (2006.01)
    *G05B 23/02* (2006.01)
    *G05D 23/19* (2006.01)
    *G06N 5/04* (2006.01)

(52) U.S. Cl.
    CPC ........... *G05B 15/02* (2013.01); *G05B 23/027* (2013.01); *G05B 23/0235* (2013.01); *G05D 23/1917* (2013.01); *G06N 5/046* (2013.01); *F24F 2011/0052* (2013.01)

(58) Field of Classification Search
    USPC ........................................................ 702/183
    See application file for complete search history.

(56) References Cited

U.S. PATENT DOCUMENTS

| | | | |
|---|---|---|---|
| 6,640,560 B2 | 11/2003 | Rohrbach et al. | |
| 7,188,482 B2 | 3/2007 | Sadegh et al. | |
| 7,219,506 B2 | 5/2007 | Kang | |
| 7,424,343 B2 | 9/2008 | Kates | |
| 2002/0183866 A1* | 12/2002 | Dean | B61C 17/04 700/26 |
| 2005/0251364 A1* | 11/2005 | Kang | G05B 9/02 702/183 |
| 2006/0042277 A1 | 3/2006 | Sadegh et al. | |
| 2008/0033674 A1 | 2/2008 | Nikovski et al. | |
| 2009/0018983 A1 | 1/2009 | El-Rafei et al. | |
| 2009/0120111 A1 | 5/2009 | Taras et al. | |
| 2009/0307034 A1 | 12/2009 | Duff et al. | |
| 2010/0000238 A1 | 1/2010 | Taras et al. | |
| 2010/0121609 A1* | 5/2010 | Gorinevsky | G05B 23/0281 702/183 |
| 2010/0324376 A1* | 12/2010 | Chinnadurai | G06Q 50/22 600/300 |
| 2011/0093424 A1* | 4/2011 | Zimmermann | G05B 17/02 706/47 |

FOREIGN PATENT DOCUMENTS

| | | |
|---|---|---|
| JP | 2004-133553 | 4/2004 |
| WO | 2007046791 A1 | 4/2007 |
| WO | WO 2012/118550 A1 | 9/2012 |

OTHER PUBLICATIONS

Chinese Office Action and Search Report for application CN 201180068516.4, dated Jul. 3, 2015 in U300728CN, 7 pages.

* cited by examiner

SPC FAULT DETECTION AND DIAGNOSTICS ALGORITHM

CROSS-REFERENCE TO RELATED APPLICATIONS

This application is a 35 U.S.C § 371 U.S. national stage filing of International Patent Application No. PCT/US11/64452 filed on Dec. 12, 2011 claiming priority under the Paris Convention and 35 U.S.C. § 119(e) to U.S. Provisional Patent Application Ser. No. 61/448,413 filed on Mar. 2, 2011.

FIELD OF THE DISCLOSURE

The present disclosure generally relates to a method and computer program product for fault detection and diagnosis of climate systems such as Heating, Ventilating and Air Conditioning (HVAC) systems, and more particularly refrigeration systems.

BACKGROUND OF THE DISCLOSURE

HVAC systems are commonly known in the art and are used in a variety of commercial, industrial, and residential applications. One example of such a system is the refrigeration systems used by commercial establishments such as grocery stores.

As these systems have increased in complexity and scale, troubleshooting has become more difficult. This difficulty is compounded by the fact that in some climate systems, such as refrigeration systems, troubleshooting operational problems may be very time sensitive. For example, if there is a loss of cooling in a refrigeration system and the temperature of stored food rises above a certain level, the stored food must be discarded. Such a loss is costly for the commercial establishment.

Troubleshooting climate systems is typically performed on a job site by a technician or through a remote call-in service center that services multiple climate systems. Monitoring systems often operate around the clock everyday. Operators monitoring climate systems must diagnose fault detections quickly and provide a rapid response to customers. As the number of systems monitored increases, the likelihood of different systems simultaneously requiring fault detection and diagnosis also increases. Such a situation strains the capacity of monitoring systems and may result in delayed diagnosis. There is a need for a diagnostic method and system that will increase the efficiency and speed of troubleshooting climate systems.

SUMMARY OF THE DISCLOSURE

In accordance with one aspect of the disclosure, a method for diagnosing a fault condition in a climate system is disclosed. The method may comprise receiving current Parameters from a climate system in the fault condition, determining a first set of transition probabilities based on the current Parameters, determining a second set of transition probabilities based on historical Parameters from the climate system operating under normal conditions, calculating an anomaly score for the climate system from the first set of transition probabilities and the second set of transition probabilities, and generating automatically a diagnosis of a first problem causing the fault condition when the anomaly score is above a predefined threshold. The current Parameters may include a plurality of current measured and estimated data from the climate system and the historical Parameters may include a plurality of historical measured and estimated data from the climate system.

In accordance with another aspect of the disclosure, a method for diagnosing problems in a refrigeration system is disclosed. The method may comprise receiving Parameters from the refrigeration system, determining a first class and a second class of anomaly groupings, determining the probability of the progression of the refrigeration system from the first class of anomaly groupings to the second class of anomaly groupings, calculating an anomaly score for the refrigeration system, automatically diagnosing first and second problems in the climate system, and transmitting the diagnosis for display on a user interface. The Parameters may include a plurality of measured and estimated data from the refrigeration system.

In accordance with yet another aspect of the disclosure, a computer program product is disclosed. The computer program product may comprises a computer usable medium having a computer readable program code embodied therein. The computer readable program code may be adapted to be executed to implement a method for diagnosing a fault condition in a climate system. The method implemented may comprise receiving current Parameters from a climate system in the fault condition, the current Parameters including a plurality of current measured and estimated data from the climate system, determining a first set of transition probabilities based on the current Parameters, determining a second set of transition probabilities based on historical Parameters from the climate system operating under normal conditions, the historical Parameters including a plurality of historical measured and estimated data from the climate system, calculating an anomaly score for the climate system from the first set of transition probabilities and the second set of transition probabilities, and when the anomaly score is above a predefined threshold, generating automatically a diagnosis of a first problem causing the fault condition.

These and other aspects of this disclosure will become more readily apparent upon reading the following detailed description when taken in conjunction with the accompanying drawings.

While the present disclosure is susceptible to various modifications and alternative constructions, certain illustrative embodiments thereof have been shown in the drawings and will be described below in detail. It should be understood, however, that there is no intention to be limited to the specific embodiments disclosed, but on the contrary, the intention is to cover all modifications, alternative constructions, and equivalents falling with the spirit and scope of the present disclosure.

DETAILED DESCRIPTION

Disclosed herein is a system and method that performs fault detection and system level diagnostics to detect system level anomalies in complex systems and diagnose root cause drivers. As part of the present disclosure, a linear mixture model may be built as a baseline model. Differences may be then analyzed between the baseline model and data received from the system. The differences may be characterized using semantic analysis. The semantic states in a Markov model may be used to capture the dynamic information of the system fault evolution. The present disclosure may be computationally scalable and flexible with respect to the types of inputs that it may receive, and may combine information from physics based estimation models, component models, control data and system summary statistics.

Figure 1:
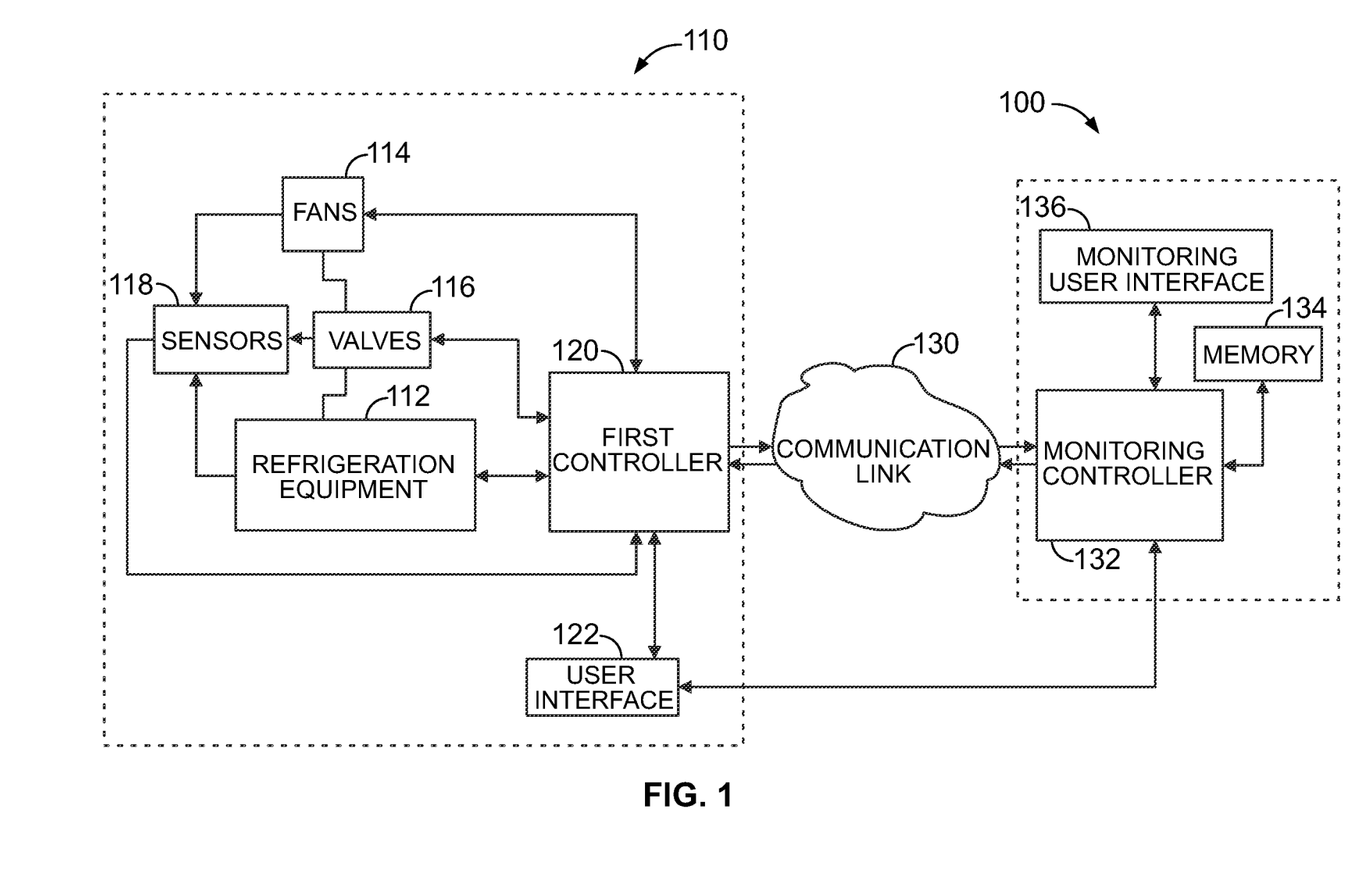
FIG. 1 is a schematic showing an embodiment of a system for monitoring an embodiment of a climate system.

Referring to the drawings and with particular reference to FIG. 1, a schematic showing an exemplary system for monitoring one possible embodiment of a climate system is provided. Such monitoring system is referred to as reference number 100. In the embodiment illustrated in FIG. 1, the climate system is a refrigeration system 110, however, the monitoring system and method disclosed herein is not limited to the monitoring of a refrigeration system 110 but may be used with any type of HVAC climate system.

As shown in FIG. 1, the refrigeration system 110 may comprise refrigeration equipment 112, fans 114, valves 116 and sensors 118 for measuring operating parameters of the refrigeration system 110. The refrigeration equipment 112 may include, but is not limited to, refrigeration lines, compressors and evaporator heat exchangers. The valves 116 may include discharge, suction and flow control valves. The fans 114 may include fans and other air flow and ventilation components and equipment. In some embodiments, a first controller 120 may be used to orchestrate and control the other elements of the refrigeration system 110. A user interface 122 may be connected to the first controller 120 for controlling, monitoring and maintaining the refrigeration system 110.

The monitoring system 100 is connected to and monitors one or more climate systems 110. As shown in FIG. 1, the monitoring system 100 may be remotely located from the refrigeration system and may be connected to the refrigeration system 110 by a communication link 130 such as the internet or other type of appropriate communication network across which data may be received from the refrigeration system 110 by the monitoring system 100. In some embodiments, data may also be sent by the monitoring system 100 across the communication link 130 to the refrigeration system 110 or to the user interface 122 connected to the refrigeration system 110.

The monitoring system 100 may comprise a monitoring controller 132 and a memory 134 connected to the monitoring controller 132. A monitoring user interface 136 may also be connected to the controller 132. A computer program product comprising a computer usable medium having a computer readable program code embodied therein may be stored in the memory 134 and may be adapted to be executed to implement the method of diagnosing a fault condition as disclosed herein.

While in the embodiment illustrated in FIG. 1, the monitoring system 100 is remotely is connected to the refrigeration system's controller 120, other types of configurations may be utilized in other embodiments. For example, the monitoring system may be on-site with the climate system 110 and may also replace the function of the climate system's controller 120. In some embodiments, the user interface 122 may be connected to the monitoring system controller 132 and the refrigeration system controller 120. Such an interface may be able to receive and transmit information from the monitoring system controller 132, receive and transmit information from the refrigeration system 110 and control some or all of the elements of the refrigeration system 110.

To provide for the monitoring system 100 to efficiently detect faults in a refrigeration system 110, a baseline model is developed over a period of time for each refrigeration system 110 (climate system) monitored by the monitoring system 100. Such a baseline model provides information on how each refrigeration system 110 should function based on the age and type of refrigeration equipment, fans, valves, the physical location of the equipment and other factors that may affect the performance and life cycle of the refrigeration system 110. The baseline model represents the typical or "normal" operating patterns and anomaly patterns for the specific refrigeration system 110 being monitored.

Figure 2:
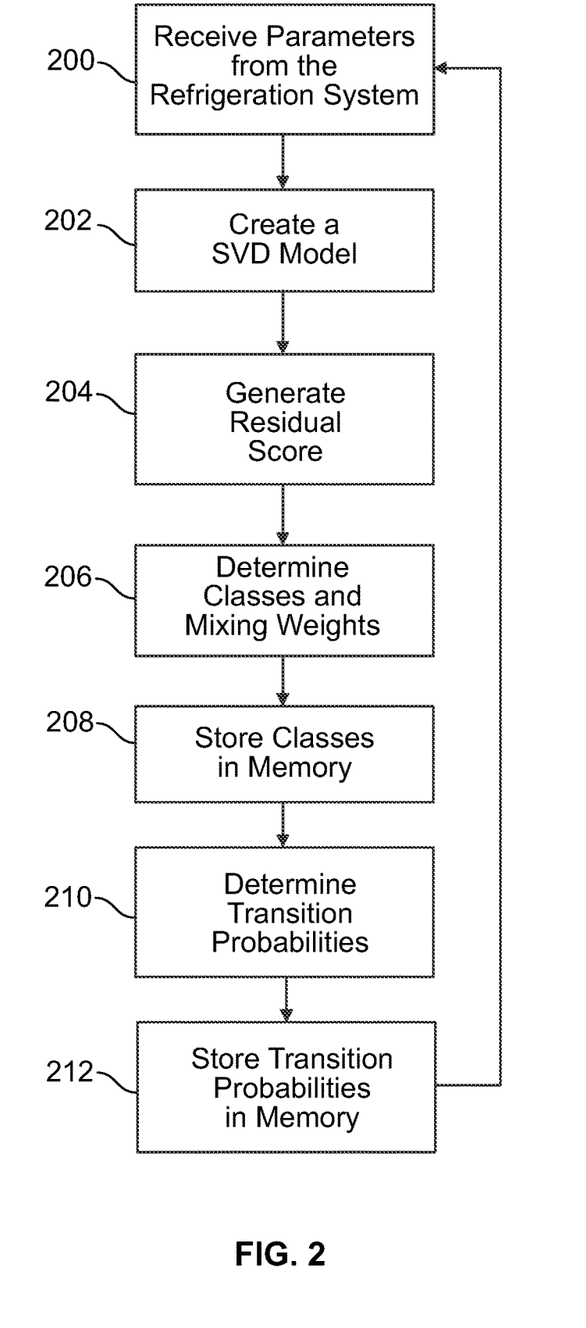
FIG. 2 is a flowchart depicting a sample sequence of steps, which may be practiced according to the method of the present disclosure, to build the baseline model of the climate system of FIG. 1.

FIG. 2 illustrates an embodiment of one process for building the baseline model. In step 200 measured data from sensors and estimated data (collectively, "Parameters") are received by the monitoring system 100 from the refrigeration system 110. The measured data may be collected from the various sensors 118 that monitor the operation of the refrigeration system 110. For example, sensors 118 may provide operational data from different refrigeration zones, air handling units, bridges, and electrical units. Measured data may include the temperatures in various refrigerator cases and compressors, pressure readings, fan speeds, the amount of energy used by the compressors, and the air flow rates. Estimated data may include system information that is not directly measured by the sensors 118 but that may be calculated based on known or measured data. For example, such estimated data may include water flow rates, which may be estimated through energy balance equations. Installation of flow meters may be expensive relative to other types of meters. If the flow information is not directly needed for control of a system 110, they may not be installed. Estimated data may also include component energy use. Total energy usage for a component piece of equipment may often be estimated through physics based models.

In step 202, a reduced rank iterative Singular Value Decomposition (SVD) Model is created using the measured and estimated data as it is collected over time. The following is one example of such a SVD model that may be utilized:

$$\overline{X} = \Sigma_{i=1}^{R} \sqrt{\lambda_i} u_i v_i^T$$

In the model above, the left and right eigenvectors $u_i$ and $v_i$ are obtained by the singular value decomposition of the sensor data matrix X.

The SVD Model may be updated over time in streaming fashion if desired. The time period for building the model is discretionary based on the complexity of the climate system. To determine typical anomaly patterns for the refrigeration system 110 each time the SVD Model is updated, a SVD residual score may be created as a sum of $X_R$ (step 204). $X_R$ is a non-negative residual matrix obtained as shown below where X is the new data received from the refrigeration system 110 and $\underline{X}$ represents the last baseline model created using SVD.

$$X_R = |X - \overline{X}|$$

Figure 3:
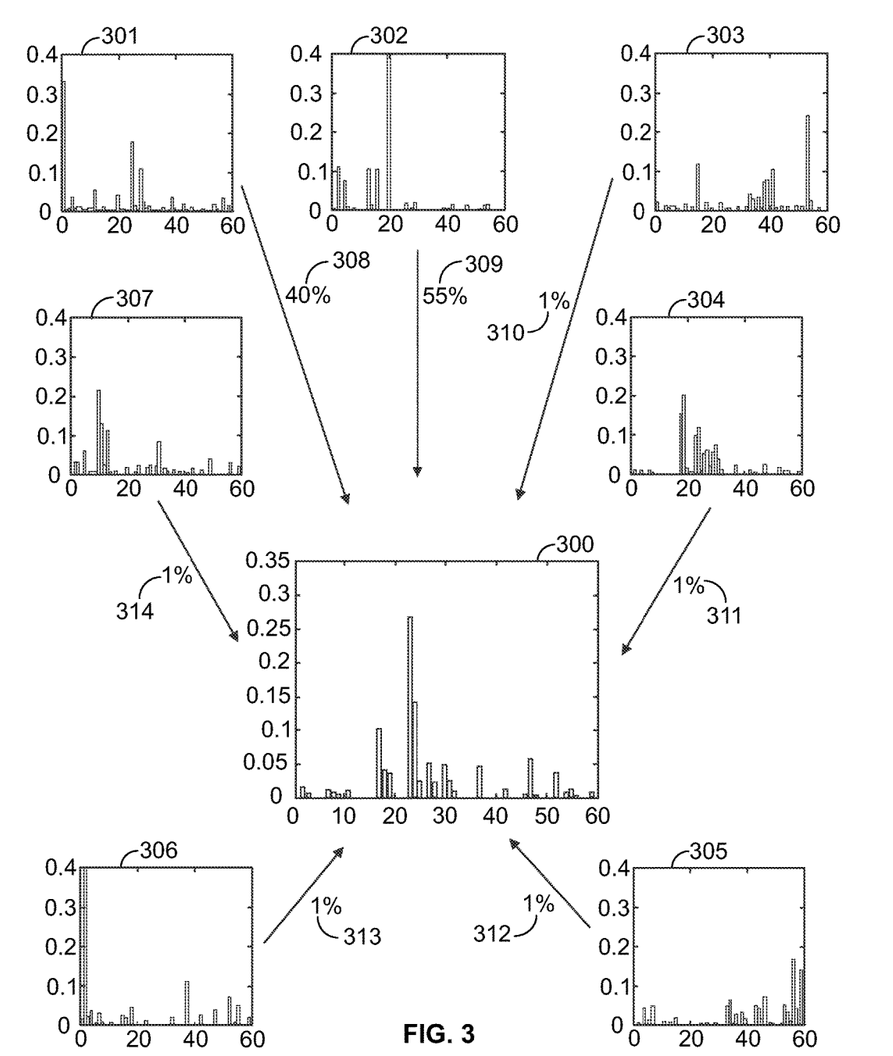
FIG. 3 illustrates one embodiment of classes derived from the observed probability distribution of the scaled residual vector calculated for the Singular Valve Decomposition Model for an exemplary climate system.

The scaled residual vector (column of $X_R$) may be viewed as an observed probability distribution. FIG. 3 illustrates a probability distribution 300 for an exemplary SVD residual score associated with a model for refrigeration system 110. Features of the refrigeration system 110 may be numbered across the x-axis of the probability distribution. The features may be based at least in part on or may be derived from the operational Parameters (measured and estimated data) of the refrigeration system 110. For example, such variables may include "gas cooler fan power," "gas cooler air flow rate," and "total cooling capacity." The y-axis of the probability distribution 300 represents the features relative contribution to the scaled residual vector.

An observed probability distribution 300 may be comprised of a mixture of hidden condition classes of commonly co-occurring faults or "anomaly groupings" that may not be readily apparent from the observed probability distribution 300. Such classes may represent the "signatures" of different operation modes (normal or anomalous). Such classes may be broken out from the observed probability distribution 300, and an estimated mixing weight (weighted average) assigned to each class for the class' contribution to the aggregate probability distribution 300. In step 206, Probabilistic Latent Semantic Analysis (PLSA) based on an EM algorithm that maximizes the likelihood of the observed data may be used to generate such classes. In this algorithm, features generation is iterative and minimizes KL-Divergence. The KL-Divergence is a measure of the difference between two probability distributions. This may also be referred to as the "information divergence" or "relative entropy". Herein, the two distributions are the measured data distribution and expected data distribution from the building of the baseline model.

The result is that the parent probability distribution 300 is broken down into a number of classes each represented by its own probability distribution of features within the class. FIG. 3 illustrates an embodiment of the initial "parent" probability distribution 300 and the probability distributions for each resulting class 301-307. The features across the x-axis of each class' probability distribution 301-307 are the same set of features across the x-axis as in the parent probability distribution 300.

Each mixing weight 308-314 associated with each hidden condition class 301-307 probability distribution may be analogous to a weighted average associated with each class 308-314. As shown in the embodiment illustrated in FIG. 3, there are seven hidden condition classes 301-307. "Class One" (and its probability distribution) 301 has a mixing weight 308 of about 40% and "Class Two" (and its probability distribution) 302 has a mixing weight 309 of about 55%. Each of the remaining classes 303-307 has a mixing weight (310-314) of 1%. Thus, in this embodiment, it is likely that the current condition flagged by the SVD residual score may be due to conditions represented by "Class One" 301 and "Class Two" 302. For example, if "Class One" represents moderate gas cooler fouling in conjunction with motor degradation, and Class Two represents fan blockage in conjunction with overheating of the refrigeration case, about 40% of the current aggregate condition of the refrigeration system may be due to moderate gas cooler fouling and motor degradation, and about 55% due to a fan blockage resulting in overheating of the refrigeration case. In other embodiments, greater or fewer hidden condition classes may be found and the values assigned to the mixing weights may be different. As the model of the refrigeration system is built and classes are diagnosed related to various anomaly situations, the resultant classes and their probability distributions associated with a diagnosis are stored in the memory 134 for future reference (step 208).

The various condition classes help diagnose a condition at a point in time. In step 210, a Markov Model may then be used to understand the progression of a condition in the refrigeration system over time in order to more accurately diagnose the root cause of a fault condition. Using a Markov Model, data obtained during normal operation of the refrigeration system may be used to learn the transition probabilities between the various hidden condition classes. For example, if in an embodiment the system determines that the observed probability distribution 300 of a refrigeration system 110 is experiencing an operating condition primarily driven by the conditions represented by Class One 301, the Markov Model may indicate that it is 30% likely that the current operating condition of the refrigeration system will progress or transition to the conditions represented by Class Four 304 and 70% likely that the current operating condition of the refrigeration will transition to the conditions represented by Class Five 305.

A first order Markov Model may be created using the features as discrete states to identify the transition probabilities between each class. The PLSA mixing weights 308-314 are used to determine the most likely state "z" at each point in time, z(0), z(1) . . . z(N). The transition probabilities may be estimated as $$P(i, j) = \frac{\Gamma(i, j)}{\sum_{j=1}^{R} \Gamma(i, j)}$$

The Bi-variate distribution is estimated as $$\Gamma(i, j) = \frac{1}{N} \sum_{i=0}^{N-1} (z(t) == i) \wedge (z(t+1) == j)$$

Understanding the expected transitions in a system based on historical data allows the system 110 to identify those situations when the expected progression of the "normal" condition in the refrigeration system (due to aging, typical maintenance issues, and wear and tear) differs from the estimated evolution of a current condition of the refrigeration system. In step 212 the results of step 210 are periodically stored in memory for future use. Steps 200-210 or the process in FIG. 2 may be repeated each time new data is received for the refrigeration system 110. Step 212 may be performed periodically in a batch mode.

Once the baseline model is sufficiently developed, the system is able to automatically detect and identify problems. The term "automatically" refers to the detection and diagnosis of the problem without having human intervention. The process is outlined in FIG. 4.

Figure 4:
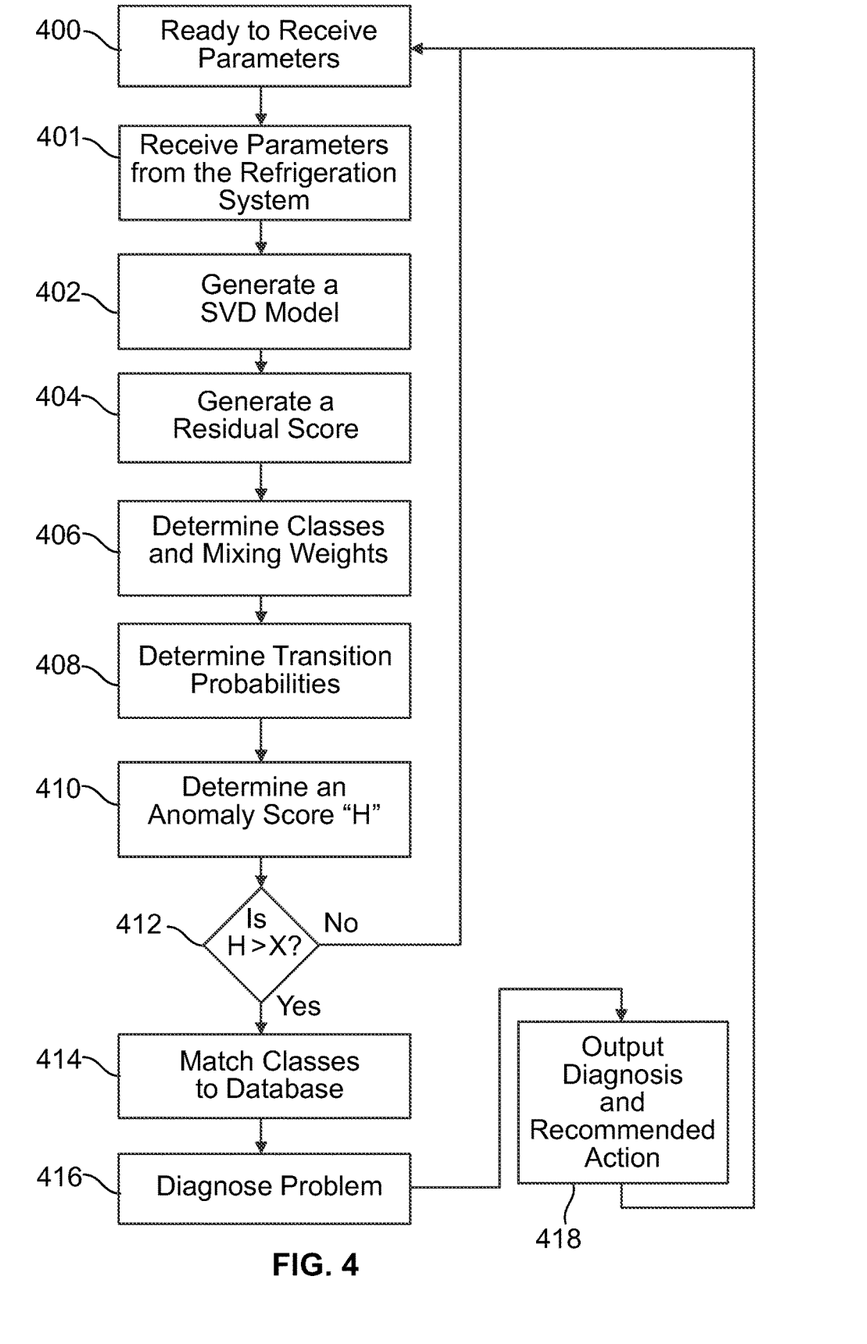
FIG. 4 is a flowchart depicting a sample sequence of steps, which may be practiced according to the method of the present disclosure, to identify and diagnose a fault in the climate system of FIG. 1.

Referring now to FIG. 4, in step 400 the monitoring system 100 is ready to receive Parameters from the refrigeration system 110. In step 401, the monitoring system 100 receives Parameters from the refrigeration system 110. In step 402, the monitoring system 100 generates a SVD Model using the same methodology as discussed above in relation to step 202 of the flow chart depicted in FIG. 2 (for building the baseline model for the refrigeration system 110).

Similarly, in step 404 the monitoring system 100 generates a SVD residual score using the same methodology as discussed with regard to step 204 of FIG. 2. Likewise, in step 406, the monitoring system 100 determines the classes and mixing weights using the same methodology as discussed above with regard to step 206 in FIG. 2. In step 408 the monitoring system 100 determines the transition probabilities using the same methodology as discussed above in relation to step 210 in FIG. 2.

In step 410 an anomaly score is generated based on the transition probabilities of the current refrigeration system condition and the transition probabilities of the refrigeration system under normal conditions. This anomaly score provides a measurement representing a comparison of the expected progression of the condition of the refrigeration system to the estimated progression of the current condition of the refrigeration system. Universal Hypothesis Testing (UHT) is used to obtain this anomaly score H. The anomaly score H is a UHT rate function that represents the difference between the relative entropies of bivariate distributions and univariate distributions. One embodiment of the anomaly score is shown below:

$$H=D(\rho^2\|\pi^2)-D(\rho\|\pi)$$

On simplification this yields:

$$H = \sum_{i,j=1}^{r} \rho^2(i,j)\log\left(\frac{Q(i,j)}{P(i,j)}\right)$$

In the above formula, P is the Transition Probability Matrix of normal behavior with marginal distribution $\pi$ and bivariate distribution $\pi^2$. Q is the Transition Probability matrix of observed data, with marginal distribution $\rho$ and bivariate distribution $\rho^2$. A threshold X is set heuristically. In step 412, if the anomaly score H is greater than X, an anomaly flag is triggered in the system that indicates a fault condition.

In step 414, the classes generated by step 406 associated with the highest mixing weights above a predefined threshold are matched to classes stored previously in the database memory 134. In step 416, when a stored match is found for each class, the problem(s) is diagnosed as caused in whole or in part by the problem(s) associated with each match found stored in the database.

Figure 5:
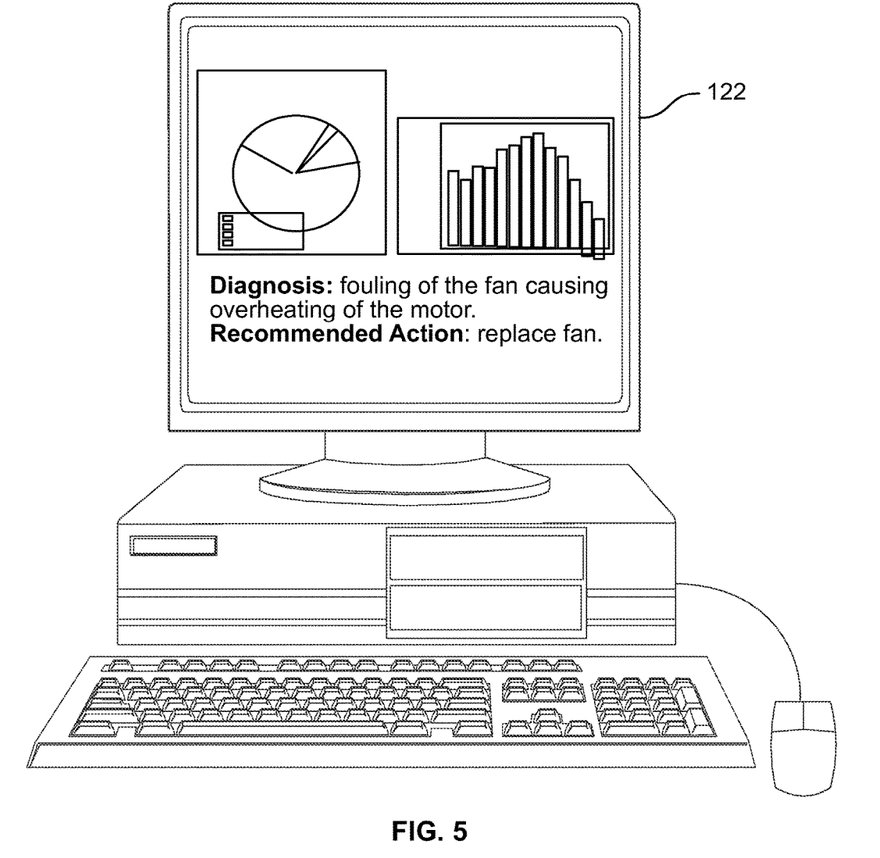
FIG. 5 illustrates an embodiment of a user interface displaying fault detection diagnosis and recommended corrective action.

In step 418, the diagnosis and, in some embodiments the recommended course of action to cure the problem diagnosed, is/are output to a user interface. As shown in FIG. 5, the diagnosis (and recommended action) may be output in a variety of ways as is known in the art, including but not limited to, an user interface such as a display screen, a printed report, or through a phone notification system. The diagnosis may be in the form of charts or text describing the problem's root diagnosis.

If the threshold for H is not triggered, the process repeats at step 400.

While only certain embodiments have been set forth, alternatives and modifications will be apparent from the above description to those skilled in the art. These and other alternatives are considered equivalents and within the spirit and scope of this disclosure.

What is claimed is:

1. A method for diagnosing a fault condition in a climate system, the method comprising:
receiving current parameters from a climate system in the fault condition, the current parameters including a plurality of current measured and estimated data from the climate system;
determining a first set of transition probabilities based on the current parameters, the first set of transition probabilities providing a likelihood that a current operating condition of the climate system will transition to a respective condition;
determining a second set of transition probabilities based on historical parameters from the climate system operating under normal conditions, the historical parameters including a plurality of historical measured and estimated data from the climate system, the second set of transition probabilities providing a likelihood that the climate system will transition to a respective condition under normal conditions;
calculating an anomaly score for the climate system from the first set of transition probabilities and the second set of transition probabilities;
when the anomaly score is above a predefined threshold, generating automatically a diagnosis of a first problem causing the fault condition;
altering operation of the climate system in response to the diagnosis of the first problem, the altering operation of the climate system comprising replacing at least one mechanical component of the climate system.

2. The method of claim 1, wherein the climate system is an HVAC system.

3. The method of claim 1, wherein the climate system is a refrigeration system.

4. The method of claim 1 further comprising determining a probability of a progression of the climate system from a first condition class to a second condition class.

5. The method of claim 4, wherein the first condition class and the second condition class are based on normal operating conditions.

6. The method of claim 4, wherein the first condition class and the second condition class are based on the current parameters.

7. The method of claim 6 further comprising displaying on a user interface a probability distribution for the first condition class.

8. The method of claim 1, further comprising determining for the climate system a baseline model derived, at least in part, from application of linear iterative Singular Value Decomposition to the historical parameters in combination with the application of Probabilistic Latent Semantic Analysis to determine a plurality of condition classes from residual score XR.

9. The method of claim 8, further comprising determining transition probabilities during normal operation of the climate system between each of the condition classes using a Markov Model.

10. The method of claim 8, further comprising updating the baseline model for a change in the refrigeration system equipment.

11. The method of claim 8, wherein each condition class comprises co-occurring problems.

12. The method of claim 8, further comprising generating for each condition class a probability distribution.

13. The method of claim 1, further comprising displaying on a user interface recommended corrective action based on the diagnosis.

14. The method of claim 1 further comprising diagnosing a second problem in the climate system that co-exists with the first problem.

15. The method of claim 1 further comprising:
determining a first class and a second class of anomaly groupings;

determining a probability of the progression of the refrigeration system from the first class of anomaly groupings to the second class of anomaly groupings;

calculating the anomaly score for the refrigeration system in response to the probability of the progression of the refrigeration system from the first class of anomaly groupings to the second class of anomaly groupings.

16. The method of claim 15, further comprising determining a plurality of condition classes based on the parameters received from the refrigeration system.

17. The method of claim 16, wherein each condition class comprises co-occurring problems.

18. The method of claim 16, further comprising matching a probability distribution for a condition class to information stored in a database to determine the first problem.

19. The method of claim 15 further comprising displaying on a user interface recommended corrective action based on the diagnosis.

* * * * *